United States Patent
Gao et al.

(10) Patent No.: US 11,416,283 B2
(45) Date of Patent: Aug. 16, 2022

(54) METHOD AND APPARATUS FOR PROCESSING DATA IN PROCESS OF EXPANDING OR REDUCING CAPACITY OF STREAM COMPUTING SYSTEM

(71) Applicant: BEIJING BAIDU NETCOM SCIENCE AND TECHNOLOGY CO., LTD., Beijing (CN)

(72) Inventors: Weikang Gao, Beijing (CN); Yanlin Wang, Beijing (CN); Yue Xing, Beijing (CN); Jianwei Zhang, Beijing (CN); Yi Cheng, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 187 days.

(21) Appl. No.: 16/503,145

(22) Filed: Jul. 3, 2019

(65) Prior Publication Data
US 2020/0026553 A1    Jan. 23, 2020

(30) Foreign Application Priority Data
Jul. 23, 2018    (CN) .......................... 201810812280.4

(51) Int. Cl.
*G06F 9/48*    (2006.01)
*G06F 9/50*    (2006.01)
(Continued)

(52) U.S. Cl.
CPC .......... *G06F 9/4843* (2013.01); *G06F 9/4401* (2013.01); *G06F 9/4881* (2013.01);
(Continued)

(58) Field of Classification Search
None
See application file for complete search history.

(56) References Cited

U.S. PATENT DOCUMENTS 10,097,595 B2 * 10/2018 Shi .......................... G06F 9/5083
10,178,021 B1 *  1/2019 Devillard ................ H04L 45/04
(Continued)

FOREIGN PATENT DOCUMENTS

| CN | 101217491 A | 7/2008 |
| CN | 103530189 A | 1/2014 |

(Continued)

OTHER PUBLICATIONS

Chinese Office Action for Chinese Application No. 201810812280.4, dated May 24, 2021, 10 pages.

*Primary Examiner* — Abu Zar Ghaffari
(74) *Attorney, Agent, or Firm* — Seed IP Law Group LLP

(57) ABSTRACT

A method and apparatus for processing stream data are provided. The method may include: acquiring a to-be-adjusted number of target execution units, the target execution unit referring to a unit executing a target program segment in a stream computing system; adjusting a number of the target execution units in the stream computing system based on the to-be-adjusted number; determining, for a target execution unit in at least one target execution unit after the adjustment, an identifier set corresponding to the target execution unit, an identifier in the identifier set being used to indicate to-be-processed data; and processing, through the target execution unit, the to-be-processed data indicated by the identifier in the corresponding identifier set.

9 Claims, 6 Drawing Sheets

(51) Int. Cl.
*G06F 9/54* (2006.01)
*G06F 9/4401* (2018.01)
*G06F 9/455* (2018.01)

(52) U.S. Cl.
CPC .......... *G06F 9/5061* (2013.01); *G06F 9/5088* (2013.01); *G06F 9/544* (2013.01); *G06F 9/5027* (2013.01); *G06F 2009/45579* (2013.01)

(56) References Cited

U.S. PATENT DOCUMENTS

| | | | | |
|---|---|---|---|---|
| 11,089,076 B1* | 8/2021 | Thario | .................. | H04L 65/602 |
| 2010/0070828 A1* | 3/2010 | Murakami | .......... | H04L 27/0008 |
| | | | | 714/E11.032 |
| 2012/0265890 A1* | 10/2012 | Carlson | ................ | H04L 65/602 |
| | | | | 709/231 |
| 2013/0013901 A1* | 1/2013 | Hansen | ............... | G06F 9/30087 |
| | | | | 712/222 |
| 2013/0159255 A1* | 6/2013 | Kaga | .................. | G06F 11/1458 |
| | | | | 707/640 |
| 2015/0026347 A1* | 1/2015 | Qian | ....................... | G06F 9/505 |
| | | | | 709/226 |
| 2015/0128150 A1* | 5/2015 | Ueda | ..................... | G06F 9/4881 |
| | | | | 718/105 |
| 2015/0295970 A1* | 10/2015 | Wang | .................... | G06F 9/5027 |
| | | | | 709/231 |
| 2016/0078093 A1* | 3/2016 | Anzalone | ............. | G06F 16/283 |
| | | | | 707/756 |
| 2016/0171009 A1* | 6/2016 | Fang | .................... | G06F 16/1752 |
| | | | | 707/692 |
| 2016/0248688 A1 | 8/2016 | Barsness et al. | | |
| 2016/0373494 A1* | 12/2016 | Shi | ........................ | G06F 9/5083 |
| 2017/0091011 A1* | 3/2017 | Liisberg | ............... | G06F 11/1641 |
| 2017/0201434 A1* | 7/2017 | Liang | ..................... | G06F 11/00 |
| 2017/0212894 A1* | 7/2017 | Feng | ..................... | G06F 16/244 |
| 2018/0083839 A1* | 3/2018 | Fawcett | ................. | H04L 41/20 |

FOREIGN PATENT DOCUMENTS

| | | |
|---|---|---|
| CN | 103782270 A | 5/2014 |
| CN | 104252466 A | 12/2014 |
| CN | 104298556 A | 1/2015 |
| CN | 104424186 A | 3/2015 |
| CN | 104978232 A | 10/2015 |
| CN | 106874133 A | 6/2017 |
| CN | 108073445 A | 5/2018 |

\* cited by examiner

METHOD AND APPARATUS FOR PROCESSING DATA IN PROCESS OF EXPANDING OR REDUCING CAPACITY OF STREAM COMPUTING SYSTEM

CROSS-REFERENCE TO RELATED APPLICATIONS

This application claims priority to Chinese Application No. 201810812280.4, filed on Jul. 23, 2018 and entitled "Method and Apparatus for Processing Data," the entire disclosure of which is hereby incorporated by reference.

TECHNICAL FIELD

Embodiments of the present disclosure relate to the field of computer technology, and specifically to a method and apparatus for processing data.

BACKGROUND

Stream computing is widely applied in large-scale distributed computing scenarios such as a scenario of information flow, a scenario of searching to construct a database, and a scenario of charging for retrievals. The stream computing is a pipeline-like data processing mode. The stream computing comes from a concept that data processing is performed once instantly as soon as one event occurs, instead of buffering data for batch processing.

In a stream computing system, the traffic generally has obvious fluctuations, which is greatly affected by an unexpected event, seasonality and so on. In order to ensure the service quality and make a rational use of resources, it is required to expand the capacity when the traffic is at the peak and reduce the capacity when the traffic is at the trough.

When the capacity of the current streaming computing system is expanded and reduced, it is required to first stop a task involved in the streaming computing system and update the concurrency configuration, and then restart the task involved in the streaming computing system.

SUMMARY

Embodiments of the present disclosure propose a method and apparatus for processing data.

In a first aspect, the embodiments of the present disclosure provide a method for processing data. The method includes: acquiring a to-be-adjusted number of target execution units, the target execution unit referring to a unit executing a target program segment in a stream computing system; adjusting a number of the target execution units in the stream computing system based on the to-be-adjusted number; determining, for a target execution unit in at least one target execution unit after the adjustment, an identifier set corresponding to the target execution unit, an identifier in the identifier set being used to indicate to-be-processed data; and processing, through the target execution unit, the to-be-processed data indicated by the identifier in the corresponding identifier set.

In some embodiments, before the processing, through the target execution unit, the to-be-processed data indicated by the identifier in the corresponding identifier set, the method further includes: persisting, according to an identifier set to which an identifier of to-be-processed data generated through running of an upstream execution unit of the target execution unit belongs, the generated to-be-processed data through the upstream execution unit of the target execution unit In some embodiments, after the processing, through the target execution unit, the to-be-processed data indicated by the identifier in the corresponding identifier set, the method further includes: sending indication information to the upstream execution unit of the target execution unit through the target execution unit, the indication information being used to indicate the to-be-processed data generated through the running of the upstream execution unit of the target execution unit and processed by the target execution unit.

In some embodiments, the processing, through the target execution unit, the to-be-processed data indicated by the identifier in the corresponding identifier set includes: restarting the at least one target execution unit after the adjustment; and receiving and processing, through the restarted target execution unit, to-be-processed data not processed by the target execution unit, wherein the to-be-processed data is sent by the upstream execution unit of the target execution unit, is in the persisted to-be-processed data indicated by the identifier included in the identifier set corresponding to the target execution unit, and is determined according to the indication information In some embodiments, the processing, through the target execution unit, the to-be-processed data indicated by the identifier in the corresponding identifier set includes: de-duplicating, according to a historical record of receiving the to-be-processed data by the target execution unit in the stream computing system, the to-be-processed data sent to the target execution unit by the upstream execution unit of the target execution unit; and processing, through the target execution unit, the de-duplicated to-be-processed data indicated by the identifier in the corresponding identifier set In a second aspect, the embodiments of the present disclosure provide an apparatus for processing data. The apparatus includes: an acquiring unit, configured to acquire a to-be-adjusted number of target execution units, the target execution unit referring to a unit executing a target program segment in a stream computing system; an adjusting unit, configured to adjust a number of the target execution units in the stream computing system based on the to-be-adjusted number; and a processing unit, configured to determine, for a target execution unit in at least one target execution unit after the adjustment, an identifier set corresponding to the target execution unit, an identifier in the identifier set being used to indicate to-be-processed data; and process, through the target execution unit, the to-be-processed data indicated by the identifier in the corresponding identifier set.

In some embodiments, the processing unit includes: a persisting subunit, configured to persist, according to an identifier set to which an identifier of to-be-processed data generated through running of an upstream execution unit of the target execution unit belongs, the generated to-be-processed data through the upstream execution unit of the target execution unit.

In some embodiments, the processing unit includes: a sending subunit, configured to send indication information to the upstream execution unit of the target execution unit through the target execution unit, the indication information being used to indicate the to-be-processed data generated through the running of the upstream execution unit of the target execution unit and processed by the target execution unit.

In some embodiments, the processing unit includes: a starting subunit, configured to restart the at least one target execution unit after the adjustment; and a processing subunit, configured to receive and process, through the restarted target execution unit, to-be-processed data not processed by the target execution unit, wherein the to-be-processed data is sent by the upstream execution unit of the target execution unit, is in the persisted to-be-processed data indicated by the identifier included in the identifier set corresponding to the target execution unit, and is determined according to the indication information.

In some embodiments, the processing unit includes: a de-duplicating subunit, configured to de-duplicate, according to a historical record of receiving the to-be-processed data by the target execution unit in the stream computing system, the to-be-processed data sent to the target execution unit by the upstream execution unit of the target execution unit; and a processing subunit, configured to process, through the target execution unit, the de-duplicated to-be-processed data indicated by the identifier in the corresponding identifier set.

In a third aspect, the embodiments of the present disclosure provide a device. The device includes: one or more processors; and a storage device, configured to store one or more programs. The one or more programs, when executed by the one or more processors, cause the one or more processors to implement the method described in the first aspect.

In a fourth aspect, the embodiments of the present disclosure provide a computer readable medium storing a computer program. The program, when executed by a processor, implements the method described in the first aspect.

According to the method and apparatus for processing data provided by the embodiments of the present disclosure, the to-be-adjusted number of the target execution units is acquired, and then, the number of the target execution units in the stream computing system is adjusted based on the to-be-adjusted number. Finally, for the target execution unit in the at least one target execution unit after the adjustment, the identifier set corresponding to the target execution unit is determined, and the to-be-processed data indicated by the identifier in the corresponding identifier set is processed through the target execution unit. Thus, when the capacity of the stream computing system is expanded or reduced, it is not required to first stop an involved task in the streaming computing system and re-determine the to-be-processed data of the target execution unit based on the identifier, thereby improving the efficiency of processing the data.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

The present disclosure will be described below in detail with reference to the accompanying drawings and in combination with the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
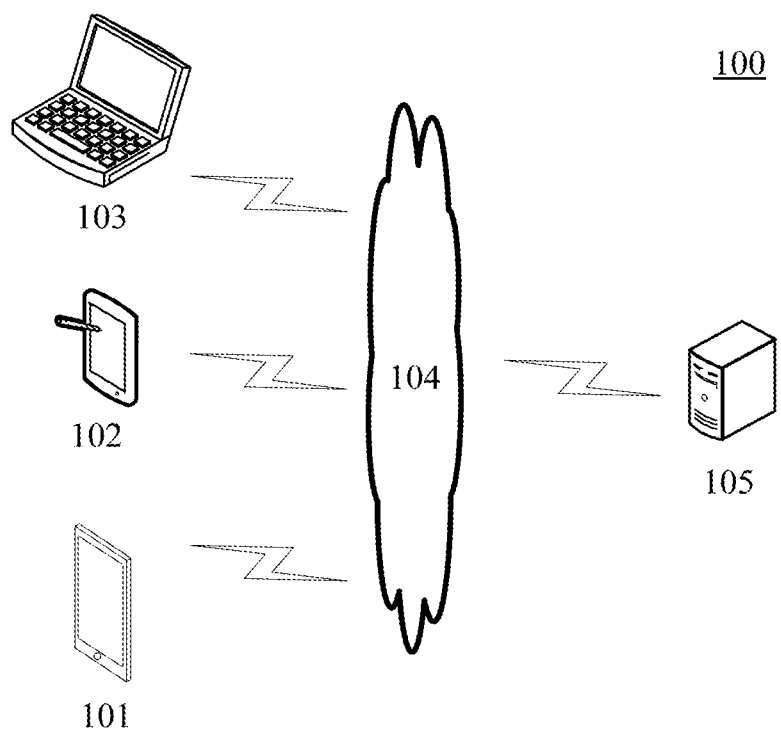
FIG. 1 is a diagram of an exemplary system architecture in which an embodiment of the present disclosure may be implemented.

FIG. 1 shows an exemplary system architecture 100 in which an embodiment of a method for processing data or an apparatus for processing data according to the present disclosure may be implemented.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, for example, wired or wireless communication links, or optical fiber cables.

A user may interact with the server 105 via the network 104 using the terminal devices 101, 102 and 103, to receive or send messages. Various applications (e.g., a social application, an image processing application, an e-commerce application and a search application) may be installed on the terminal devices 101, 102 and 103.

The terminal devices 101, 102 and 103 may be hardware or software. When being the hardware, the terminal devices 101, 102 and 103 may be various electronic devices having a display screen, which include, but not limited to, a smart phone, a tablet computer, a laptop portable computer and a desktop computer. When being the software, the terminal devices 101, 102 and 103 may be installed in the above listed electronic devices. The terminal devices may be implemented as a plurality of pieces of software or a plurality of software modules, or as a single piece of software or a single software module, which will not be specifically defined here.

The server 105 may be a server providing various services, for example, a backend server providing a support for the applications installed on the terminal devices 101, 102 and 103. The server 105 may acquire a to-be-adjusted number of target execution units, the target execution unit referring to a unit executing a target program segment in a stream computing system; adjust a number of the target execution unitss in the stream computing system based on the to-be-adjusted number; determine, for a target execution unit in at least one target execution unit after the adjustment, an identifier set corresponding to the target execution unit, an identifier in the identifier set being used to indicate to-be-processed data; and process, through the target execution unit, the to-be-processed data indicated by the identifier in the corresponding identifier set.

It should be noted that the method for processing data provided by the embodiments of the present disclosure may be generally performed by the server 105. Correspondingly, the apparatus for processing data may be provided in the server 105.

It should be noted that the server may be hardware or software. When being the hardware, the server may be implemented as a distributed server cluster composed of a plurality of servers, or as a single server. When being the software, the server may be implemented as a plurality of pieces of software or a plurality of software modules (e.g., software or software modules for providing a distributed service), or as a single piece of software or a single software module, which will not be specifically defined here.

It should be appreciated that the numbers of the terminal devices, the networks, and the servers in FIG. 1 are merely illustrative. Any number of terminal devices, networks, and servers may be provided based on actual requirements.

Figure 2:
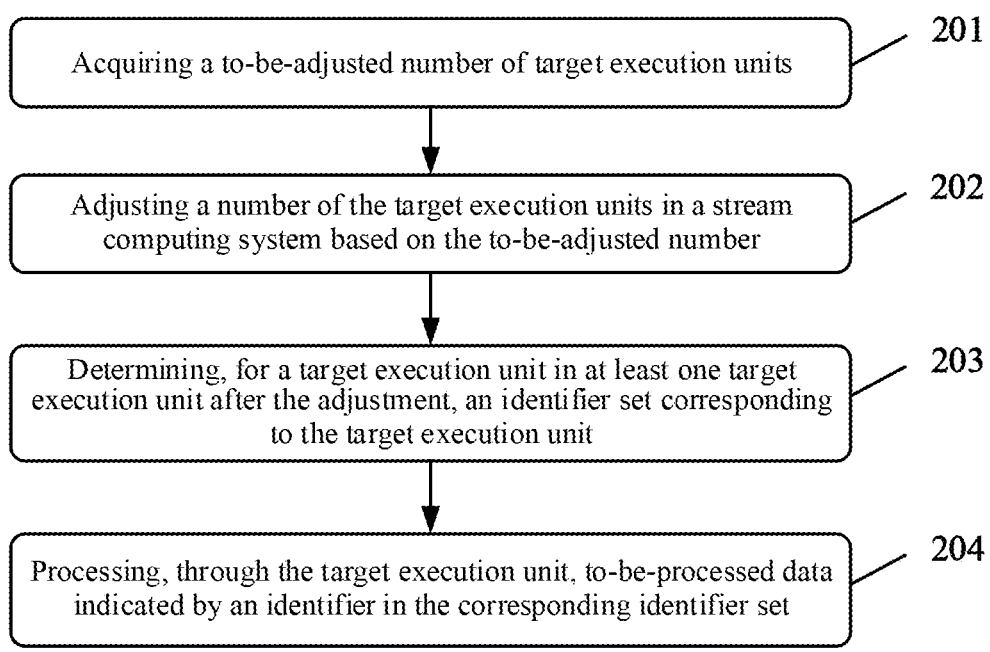
FIG. 2 is a flowchart of an embodiment of a method for processing data according to the present disclosure.

Further referring to FIG. 2, a flow 200 of an embodiment of a method for processing data according to the present disclosure is illustrated. The method for processing data includes the following steps.

Step 201, acquiring a to-be-adjusted number of target execution units.

In this embodiment, an execution body (e.g., the server shown in FIG. 1) of the method for processing data may first acquire the to-be-adjusted number of the target execution units. The target execution unit refers to a unit executing a target program segment in a stream computing system. The stream computing system may include a control node and a plurality of work nodes. A work node may also be referred to as an operator. The control node may send a corresponding control instruction to a subordinate work node, so that the work node invokes an execution unit to process a data stream generated by a service according to the control instruction. Each work node may include one or more execution units. When the work node is invoked to process the data stream, the data stream is processed by the execution units included in the work node, and the execution unit may be a thread or a process.

The stream computing system may include several stream computing tasks (applications), each of the stream computing tasks is composed of some independent computational logics (processors) according to an upstream and downstream subscription relationship. In actual operation, by configuring a concurrency (parallelism), the computational logics may be distributed on a plurality of servers in a multi-process mode. Data (Tuple) flows between processes having the upstream and downstream subscription relationship through a remote procedure call (PRC), and to-be-processed data given to a downstream execution unit is produced and a modification for an intermediate state is caused during the data processing process. The execution unit may be a thread or a process executing an independent computational logic, and the independent computational logic is embodied as a segment of a program.

The target execution unit may be a unit in the stream computing system, the number of which needs to be modified. For example, the number of the target execution units may be increased when the load is too heavy. The to-be-adjusted number may be determined by the execution body according to a corresponding relationship between a pre-established load condition and the number of the target execution units, and the load condition may be reflected by traffic information or processing speed information. The to-be-adjusted number may also be determined according a concurrency setting instruction after the concurrency setting instruction is acquired. The concurrency of the word node may represent the number of the execution units included in the work node. For example, if the concurrency of the work node is 3, it means that the work node may invoke 3 execution units to process the data stream.

Step 202, adjusting a number of the target execution units in a stream computing system based on the to-be-adjusted number.

In this embodiment, the execution body may adjust the number of the target execution units in the stream computing system based on the to-be-adjusted number acquired in step 201. If the number of the target execution units running actually in the stream computing system is identical to the to-be-adjusted number, the number of the target execution units may not need to be adjusted. If the number of the target execution units actually running in the stream computing system is different from the to-be-adjusted number, the number of the target execution units in the stream computing system may be adjusted to the to-be-adjusted number.

Step 203, determining, for a target execution unit in at least one target execution unit after the adjustment, an identifier set corresponding to the target execution unit.

In this embodiment, for the target execution unit in the at least one target execution unit after the adjustment in step 202, the execution body may first determine the identifier set corresponding to the target execution unit. An identifier in the identifier set is used to indicate to-be-processed data. The identifier may be generated according to a preset rule, for example, may be determined according to the generation order, the generation time, the storage location and the source of data.

Here, the identifier set includes the identifier for indicating the to-be-processed data of the execution unit. The identifier included in the identifier set may remain unchanged before and after the adjustment of the number of target execution units in the stream computing system. As an example, the identifier may be mapped to the identifier set using a hash algorithm, and the corresponding relationship between the identifier and the identifier set may also be pre-established by other means. A total number of identifier sets may also remain unchanged before and after the adjustment of the number of target execution units in the stream computing system. That is, the identifier sets corresponding to the total of the target execution units in the stream computing system remain unchanged. The execution body may adjust a mapping relationship between each target execution unit and each identifier set according to a preset rule. The specific rule may be set based on actual requirements. For example, in consideration of load balance, the identifier sets may be allocated averagely to the target execution units.

In some alternative implementations of this embodiment, before the to-be-processed data indicated by the identifier in the corresponding identifier set is processed through the target execution unit, the method further includes: persisting, according to the identifier set to which the identifier of the to-be-processed data generated through running an upstream execution unit of the target execution unit belongs, the generated to-be-processed data through the upstream execution unit of the target execution unit.

In this implementation, the upstream execution unit of the target execution unit may be a unit that provides the to-be-processed data to the target execution unit in the stream computing system. The persistence is a mechanism of converting program data between a persistent state and a transient state. That is, transient data (e.g., data in a memory, which cannot be permanently preserved) is persisted as persistent data, for example, persisted into the database, so that the data can be stored for a long time. The persistence may include full persistence and incremental persistence, and the incremental persistence may avoid the duplication of the data, to further improve the data processing efficiency.

According to the identifier set to which the identifier of the to-be-processed data belongs, the to-be-processed data generated through the running of the upstream execution unit is persisted, which may avoid the loss of the data when the capacity of the stream computing system is expanded or reduced, thus further improving the data processing efficiency.

Step 204, processing, through the target execution unit, to-be-processed data indicated by an identifier in the corresponding identifier set.

In this embodiment, for the target execution unit in the at least one target execution unit after the adjustment in step 202, the execution body may process, through the target execution unit, the to-be-processed data indicated by the identifier in the identifier set corresponding to the target execution unit and determined in step 203.

In some alternative implementations of this embodiment, after the to-be-processed data indicated by the identifier in the corresponding identifier set is processed through the target execution unit, the method further includes: sending, through the target execution unit, indication information to the upstream execution unit of the target execution unit. The indication information is used to indicate the to-be-processed data generated through the running of the upstream execution unit of the target execution unit and processed by the target execution unit.

In this implementation, the indication information may further be used to indicate the to-be-processed data generated through the running of the upstream execution unit of the target execution unit and successfully received by the target execution unit, for example, an acknowledgement (ACK). In the data communication, the acknowledgement may be a transmission control character sent to a sender by a receiver, representing that the receipt of the sent data is acknowledged without errors. The sending of the indication information may prevent the upstream execution unit from sending duplicated to-be-processed data to the target execution unit, thus further improving the data processing efficiency.

In some alternative implementations of this embodiment, the processing, through the target execution unit, to-be-processed data indicated by an identifier in the corresponding identifier set includes: restarting the at least one target execution unit after the adjustment; and receiving and processing, through the restarted target execution unit, to-be-processed data not processed by the target execution unit, wherein the to-be-processed data is sent by the upstream execution unit of the target execution unit, is in the persisted to-be-processed data indicated by the identifier included in the identifier set corresponding to the target execution unit, and is determined according to the indication information.

In this implementation, the target execution unit receives and processes the to-be-processed data not processed by the target execution unit, and the to-be-processed data is in the persisted to-be-processed data indicated by the identifier included in the identifier set corresponding to the target execution unit, and is determined according to the indication information. Accordingly, it is ensured that the to-be-processed data is not duplicated and lost when the capacity of the stream computing system is expanded or reduced, which further improves the data processing efficiency.

According to the method provided by the above embodiment of the present disclosure, the to-be-adjusted number of the target execution units is acquired, the target execution unit referring to the unit executing the target program segment in the stream computing system. The number of the target execution units in the stream computing system is adjusted based on the to-be-adjusted number. For the target execution unit in the at least one target execution unit after the adjustment, the identifier set corresponding to the target execution unit is determined, the identifier in the identifier set being used to indicate the to-be-processed data. The to-be-processed data indicated by the identifier in the corresponding identifier set is processed through the target execution unit. Accordingly, an identifier-based data processing mechanism is provided. An identifier set is a logical concept with few physical costs, and the setting of the identifier set is very flexible. Thus, the flexibility of the streaming computing system is improved when the capacity of the system is expanded and reduced.

Figure 3:
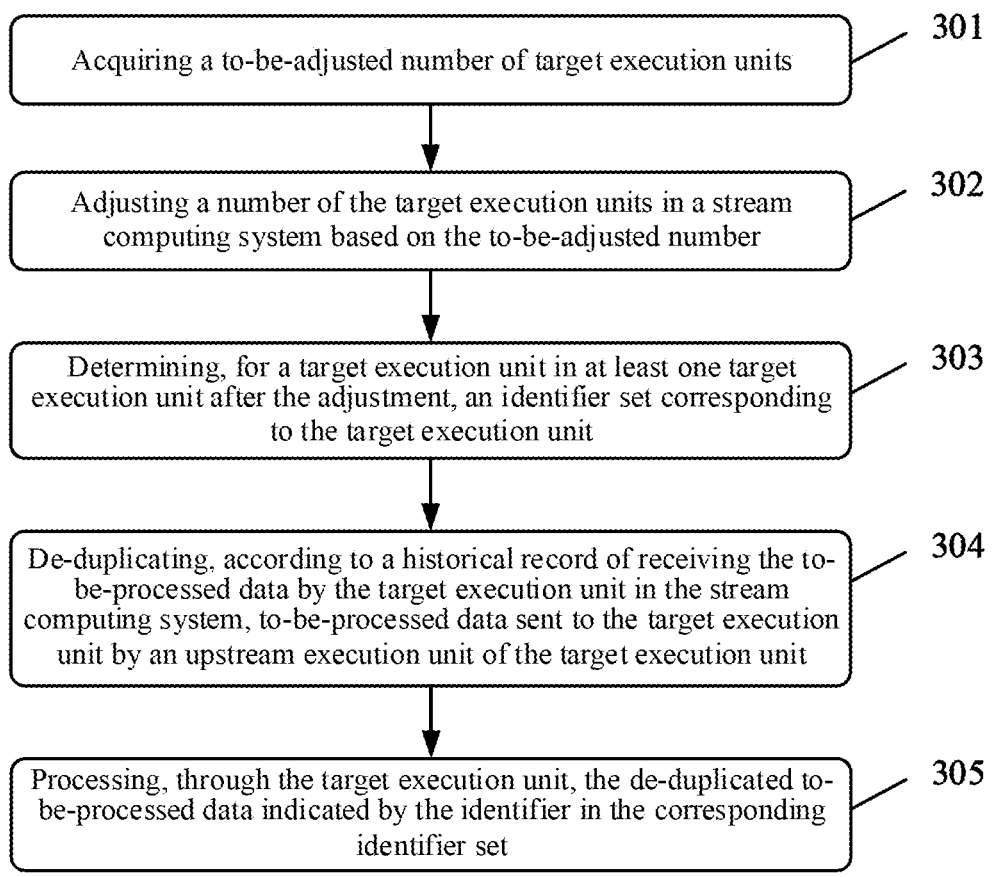
FIG. 3 is a flowchart of another embodiment of the method for processing data according to the present disclosure.

Further referring to FIG. 3, FIG. 3 illustrates a flow 300 of another embodiment of the method for processing data. The flow 300 of the method for processing data includes the following steps.

Step 301, acquiring a to-be-adjusted number of target execution units.

In this embodiment, an execution body (e.g., the server shown in FIG. 1) of the method for processing data may first acquire the to-be-adjusted number of the target execution units.

Step 302, adjusting a number of the target execution units in a stream computing system based on the to-be-adjusted number.

In this embodiment, the execution body may adjust the number of the target execution units in the stream computing system based on the to-be-adjusted number acquired in step 301.

Step 303, determining, for a target execution unit in at least one target execution unit after the adjustment, an identifier set corresponding to the target execution unit.

In this embodiment, for the target execution unit in the at least one target execution unit after the adjustment in step 302, the execution body may first determine the identifier set corresponding to the target execution unit. An identifier in the identifier set is used to indicate to-be-processed data.

Step 304, de-duplicating, according to a historical record of receiving the to-be-processed data by the target execution unit in the stream computing system, to-be-processed data sent to the target execution unit by an upstream execution unit of the target execution unit.

In this embodiment, according to the historical record of receiving the to-be-processed data by the target execution unit in the stream computing system, the execution body may de-duplicate the to-be-processed data sent to the target execution unit by the upstream execution unit of the target execution unit. The execution body may further remove, from the to-be-processed data sent to the target execution unit by the upstream execution unit of the target execution unit, data repeated with the received to-be-processed data recorded in the historical record. The historical record may include information such as the identifier of the received to-be-processed data.

Step 305, processing, through the target execution unit, the de-duplicated to-be-processed data indicated by the identifier in the corresponding identifier set.

In this embodiment, through the target execution unit, the execution body may process the to-be-processed data indicated by the identifier in the corresponding identifier set after the de-duplication in step 304, and thus, the target execution unit may merely process the data that has not been processed by the target execution unit.

In this embodiment, the operations in steps 301, 302 and 303 are substantially the same as the operations in steps 201, 202 and 203, which will not be repeatedly described here.

It may be seen from FIG. 3 that, as compared with the embodiment corresponding to FIG. 2, in the flow 300 of the method for processing data in this embodiment, the execution body filters the data that is in the to-be-processed data sent to the target execution unit by the upstream execution unit of the target execution unit and is repeated with the received data recorded in the historical record. Thus, the repeated processing on the data may be avoid, to further improve the information processing efficiency.

Figure 4:
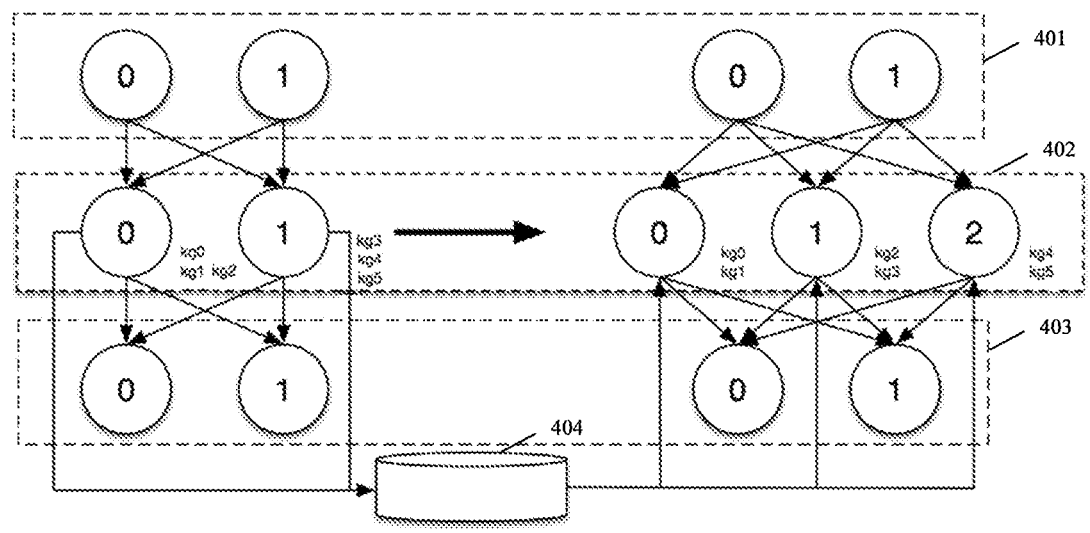
FIG. 4 is a schematic diagram of an application scenario of the method for processing data according to the present disclosure.

Further referring to FIG. 4, FIG. 4 is a schematic diagram of an application scenario of the method for processing data according to this embodiment. In the application scenario of FIG. 4, the stream computing system includes a target execution unit 402, an upstream execution unit 401 of the target execution unit 402, and a downstream execution unit 403 of the target execution unit 402. The number of target execution units 402 in the stream computing system is 2 before being adjusted, and the to-be-adjusted number of the target execution units 402 is acquired as 3. Based on the to-be-adjusted number, the number of the target execution units 402 is adjusted to 3. Before the adjustment, in the target execution units 402, the identifier sets corresponding to the unit having the identifier of 0 are kg0, kg1 and kg2, and the identifier sets corresponding to the unit having the identifier of 1 are kg3, kg4 and kg5. After the adjustment, in the target execution units 402, the identifier sets corresponding to the unit having the identifier of 0 are kg0 and kg1, the identifier sets corresponding to the unit having the identifier of 1 are kg2 and kg3, and the identifier sets corresponding to the unit having the identifier of 2 are kg4 and kg5. The to-be-processed data indicated by an identifier in the identifier sets kg0 and kg1 may be processed through the unit having the identifier of 0. The to-be-processed data indicated by an identifier in the identifier sets kg2 and kg3 may be processed through the unit having the identifier of 1. The to-be-processed data indicated by an identifier in the identifier sets kg4 and kg5 may be processed through the unit having the identifier of 2. Moreover, the data processed by the target execution units 402 may further be persisted into a storage device 404.

Figure 5:
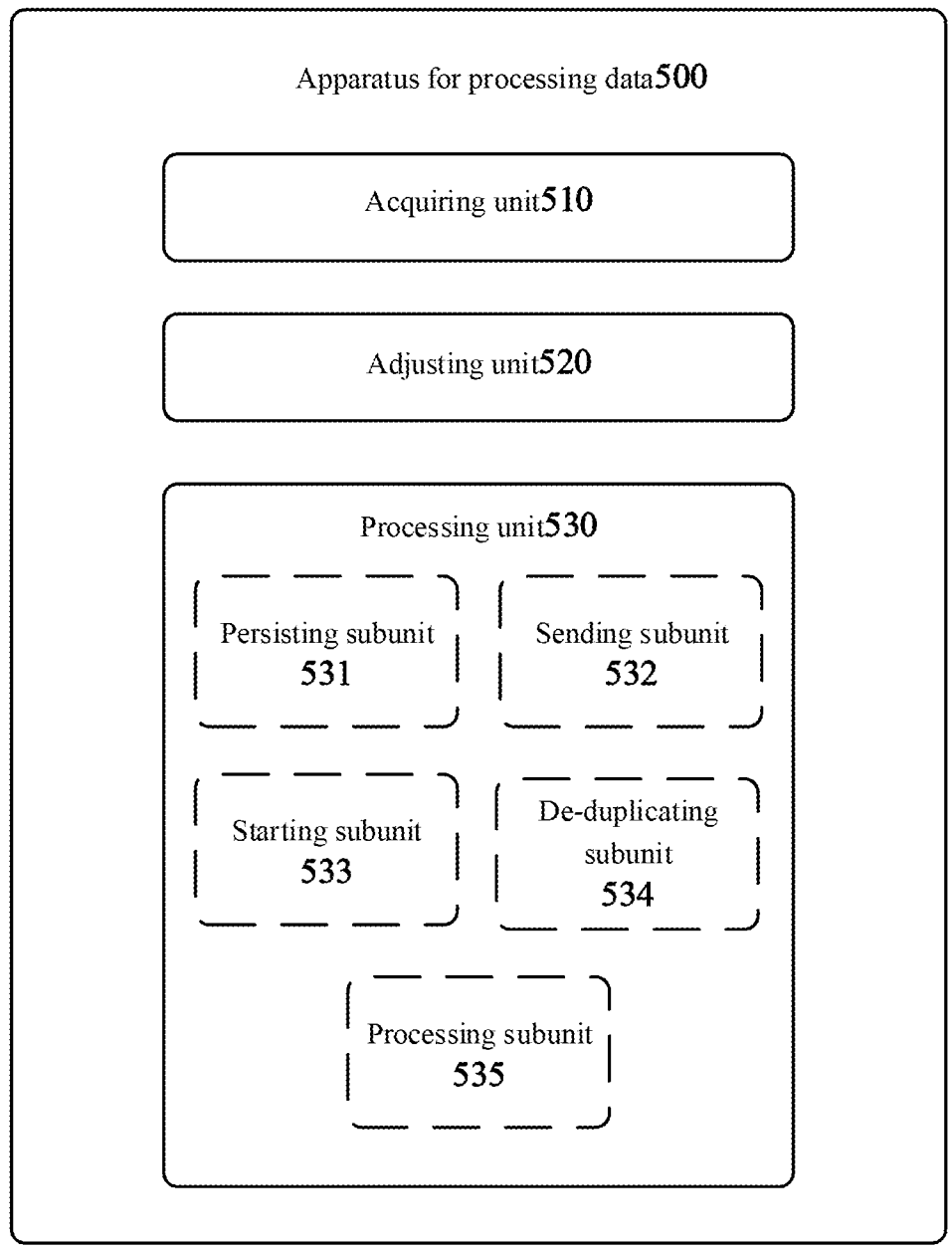
FIG. 5 is a schematic structural diagram of an embodiment of an apparatus for processing data according to the present disclosure.

Further referring to FIG. 5, as an implementation of the method shown in the above drawings, the present disclosure provides an embodiment of an apparatus for processing data. The embodiment of the apparatus corresponds to the embodiment of the method shown in FIG. 2, and the apparatus may be applied in various electronic devices.

As shown in FIG. 5, the apparatus 500 for processing data in this embodiment includes: an acquiring unit 510, an adjusting unit 520 and a processing unit 530. Here, the acquiring unit 510 is configured to acquire a to-be-adjusted number of target execution units, the target execution unit referring to a unit executing a target program segment in a stream computing system. The adjusting unit 520 is configured to adjust a number of the target execution units in the stream computing system based on the to-be-adjusted number. The processing unit 530 is configured to determine, for a target execution unit in at least one target execution unit after the adjustment, an identifier set corresponding to the target execution unit, an identifier in the identifier set being used to indicate to-be-processed data; and process, through the target execution unit, the to-be-processed data indicated by the identifier in the corresponding identifier set.

In this embodiment, for specific processing of the acquiring unit 510, the adjusting unit 520 and the processing unit 530 in the apparatus 500 for processing data, and the technical effects thereof, reference may be made to relative descriptions of step 201, step 202 and step 203 in the corresponding embodiment of FIG. 2 respectively.

In some alternative implementations of this embodiment, the processing unit 530 includes a persisting subunit 531. The persisting subunit is configured to persist, according to an identifier set to which an identifier of to-be-processed data generated through running of an upstream execution unit of the target execution unit belongs, the generated to-be-processed data through the upstream execution unit of the target execution unit.

In some alternative implementations of this embodiment, the processing unit 530 includes a sending subunit 532. The sending subunit is configured to send indication information to the upstream execution unit of the target execution unit through the target execution unit. The indication information is used to indicate the to-be-processed data generated through the running of the upstream execution unit of the target execution unit and processed by the target execution unit.

In some alternative implementations of this embodiment, the processing unit 530 includes: a starting subunit 533, configured to restart the at least one target execution unit after the adjustment; and a processing subunit 535, configured to receive and process, through the restarted target execution unit, to-be-processed data not processed by the target execution unit, where the to-be-processed data is sent by the upstream execution unit of the target execution unit, is in the persisted to-be-processed data indicated by the identifier included in the identifier set corresponding to the target execution unit, and is determined according to the indication information.

In some alternative implementations of this embodiment, the processing unit 530 includes: a de-duplicating subunit 534, configured to de-duplicate, according to a historical record of receiving the to-be-processed data by the target execution unit in the stream computing system, the to-be-processed data sent to the target execution unit by the upstream execution unit of the target execution unit; and a processing subunit 535, configured to process, through the target execution unit, the de-duplicated to-be-processed data indicated by the identifier in the corresponding identifier set.

According to the apparatus provided by the above embodiment of the present disclosure, the to-be-adjusted number of the target execution units is acquired, the target execution unit referring to the unit executing the target program segment in the stream computing system. The number of the target execution units in the stream computing system is adjusted based on the to-be-adjusted number. For the target execution unit in the at least one target execution unit after the adjustment, the identifier set corresponding to the target execution unit is determined, the identifier in the identifier set being used to indicate the to-be-processed data. The to-be-processed data indicated by the identifier in the corresponding identifier set is processed through the target execution unit. Accordingly, an identifier-based data processing mechanism is provided, thus improving the efficiency of processing the data.

Figure 6:
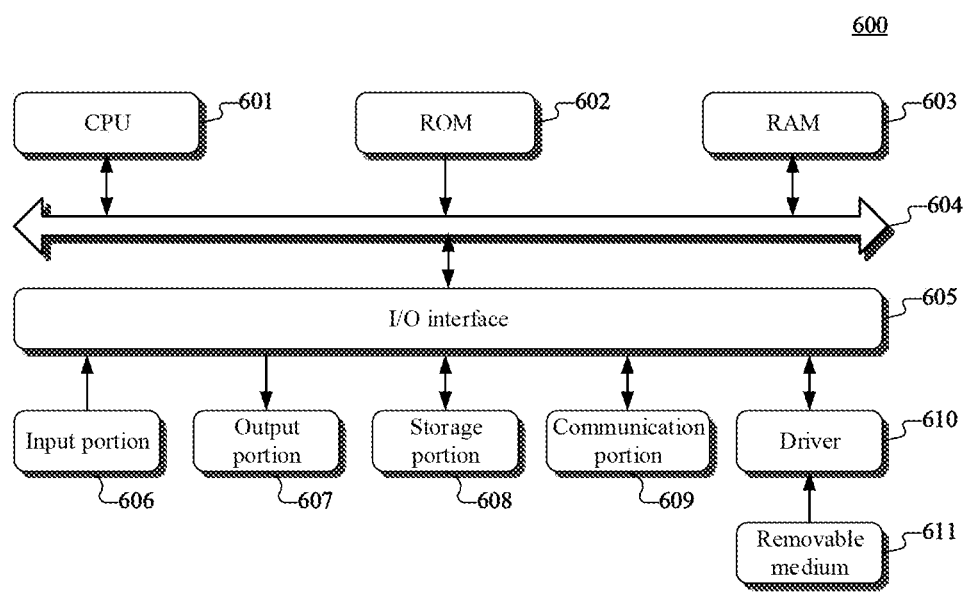
FIG. 6 is a schematic structural diagram of a computer system adapted to implement a server according to embodiments of the present disclosure.

Referring to FIG. 6, FIG. 6 is a schematic structural diagram of a computer system 600 adapted to implement a server of the embodiments of the present disclosure. The server shown in FIG. 6 is merely an example, and should not bring any limitations to the functions and the scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 including a cathode ray tube (CRT), a liquid crystal display device (LCD), a speaker etc.; a storage portion 608 including a hard disk and the like; and a communication portion 609 including a network interface card such as a LAN card and a modem. The communication portion 609 performs communication processes via a network such as the Internet. A driver 610 is also connected to the I/O interface 605 as required. A removable medium 611 such as a magnetic disk, an optical disk, a magneto-optical disk, and a semiconductor memory may be installed on the driver 610, to facilitate the retrieval of a computer program from the removable medium 611, and the installation thereof on the storage portion 608 as needed.

In particular, according to the embodiments of the present disclosure, the process described above with reference to the flow chart may be implemented in a computer software program. For example, an embodiment of the present disclosure includes a computer program product, including a computer program hosted on a computer readable medium, the computer program including program codes for performing the method as illustrated in the flowchart. In such an embodiment, the computer program may be downloaded and installed from a network via the communication portion 609, and/or may be installed from the removable medium 611. The computer program, when executed by the central processing unit (CPU) 601, implements the above mentioned functionalities defined in the method of the present disclosure. It should be noted that the computer readable medium in the present disclosure may be a computer readable signal medium, a computer readable storage medium, or any combination of the two. For example, the computer readable storage medium may be, but not limited to: an electronic, magnetic, optical, electromagnetic, infrared, or semiconductor system, apparatus, or element, or any combination of the above. A more specific example of the computer readable storage medium may include, but not limited to: an electrical connection having one or more wires, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable medium may be any physical medium containing or storing programs, which may be used by a command execution system, apparatus or element or incorporated thereto. In the present disclosure, the computer readable signal medium may include a data signal that is propagated in a baseband or as a part of a carrier wave, which carries computer readable program codes. Such propagated data signal may be in various forms, including, but not limited to, an electromagnetic signal, an optical signal, or any suitable combination of the above. The computer readable signal medium may also be any computer readable medium other than the computer readable storage medium. The computer readable medium is capable of transmitting, propagating or transferring programs for use by, or used in combination with, a command execution system, apparatus or element. The program codes contained on the computer readable medium may be transmitted with any suitable medium including, but not limited to, wireless, wired, optical cable, RF medium, or any suitable combination of the above.

A computer program code for executing the operations according to the present disclosure may be written in one or more programming languages or a combination thereof. The programming language includes an object-oriented programming language such as Java, Smalltalk and C++, and further includes a general procedural programming language such as "C" language or a similar programming language. The program codes may be executed entirely on a user computer, executed partially on the user computer, executed as a standalone package, executed partially on the user computer and partially on a remote computer, or executed entirely on the remote computer or a server. When the remote computer is involved, the remote computer may be connected to the user computer through any type of network, including a local area network (LAN) or a wide area network (WAN), or be connected to an external computer (e.g., connected through Internet provided by an Internet service provider).

The flowcharts and block diagrams in the accompanying drawings illustrate architectures, functions and operations that may be implemented according to the system, the method, and the computer program product of the various embodiments of the present disclosure. In this regard, each of the blocks in the flowcharts or block diagrams may represent a module, a program segment, or a code portion, the module, the program segment, or the code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed substantially in parallel, or they may sometimes be executed in a reverse sequence, depending on the function involved. It should also be noted that each block in the block diagrams and/or flowcharts as well as a combination of blocks may be implemented using a dedicated hardware-based system executing specified functions or operations, or by a combination of dedicated hardware and computer instructions.

The units involved in the embodiments of the present disclosure may be implemented by means of software or hardware. The described units may also be provided in a processor. For example, the processor may be described as: a processor comprising an acquiring unit, an adjusting unit and a processing unit. The names of these units do not in some cases constitute a limitation to such units themselves. For example, the acquiring unit may also be described as "a unit for acquiring a number of targets."

In another aspect, the present disclosure further provides a computer readable medium. The computer readable medium may be the computer readable medium included in the apparatus described in the above embodiments, or a stand-alone computer readable medium not assembled into the apparatus. The computer readable medium carries one or more programs. The one or more programs, when executed by the apparatus, cause the apparatus to: acquire a to-be-adjusted number of target execution units, the target execution unit referring to a unit executing a target program segment in a stream computing system; adjust a number of the target execution units in the stream computing system based on the to-be-adjusted number; determine, for a target execution unit in at least one target execution unit after the adjustment, an identifier set corresponding to the target execution unit, an identifier in the identifier set being used to indicate to-be-processed data; and process, through the target execution unit, the to-be-processed data indicated by the identifier in the corresponding identifier set.

The above description is only an explanation for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. A method for processing stream data, comprising:
   acquiring a to-be-adjusted number of target execution units, the target execution unit referring to a unit executing a target program segment in a stream computing system;
   adjusting a number of the target execution units in the stream computing system based on the to-be-adjusted number; and
   determining, for a target execution unit in at least one target execution unit after the adjustment, an identifier set corresponding to the target execution unit, an identifier in the identifier set being used to indicate to-be-processed data; persisting, according to the identifier set to which the identifier of the to-be-processed data generated through running of an upstream execution unit of the target execution unit belongs, the to-be-processed data generated through the upstream execution unit of the target execution unit into a database; and processing, through the target execution unit, the to-be-processed data indicated by the identifier in the corresponding identifier set,
   wherein determining, for the target execution unit in at least one target execution unit after the adjustment, the identifier set corresponding to the target execution unit, comprises: adjusting a mapping relationship between each target execution unit and each identifier set according to a preset rule, wherein a total number of identifier sets remains unchanged before and after the adjustment of the number of the target execution units in the stream computing system.

2. The method according to claim 1, wherein after the processing, through the target execution unit, the to-be-processed data indicated by the identifier in the corresponding identifier set, the method further comprises:
   sending indication information to the upstream execution unit of the target execution unit through the target execution unit, the indication information being used to indicate the to-be-processed data having been processed by the target execution unit.

3. The method according to claim 2, wherein the processing, through the target execution unit, the to-be-processed data indicated by the identifier in the corresponding identifier set includes:
   starting the at least one target execution unit after the adjustment; and
   receiving and processing, through the started target execution unit, the to-be-processed data that is sent by the upstream execution unit of the target execution unit and has been determined, from the persisted to-be-processed data indicated by the identifier included in the identifier set corresponding to the target execution unit.

4. The method according to claim 1, wherein the processing, through the target execution unit, the to-be-processed data indicated by the identifier in the corresponding identifier set includes:
   de-duplicating, according to a historical record of receiving the to-be-processed data by the target execution unit in the stream computing system, the to-be-processed data sent to the target execution unit by the upstream execution unit of the target execution unit; and processing, through the target execution unit, the de-duplicated to-be-processed data indicated by the identifier in the corresponding identifier set.

5. An apparatus for processing stream data, comprising:
   at least one processor; and
   a memory storing instructions, the instructions when executed by the at least one processor, cause the at least one processor to perform operations, the operations comprising:
   acquiring a to-be-adjusted number of target execution units, the target execution unit referring to a unit executing a target program segment in a stream computing system;
   adjusting a number of the target execution units in the stream computing system based on the to-be-adjusted number; and
   determining, for a target execution unit in at least one target execution unit after the adjustment, an identifier set corresponding to the target execution unit, an identifier in the identifier set being used to indicate to-be-processed data; persisting, according to the identifier set to which the identifier of the to-be-processed data generated through running of an upstream execution unit of the target execution unit belongs, the to-be-processed data generated through the upstream execution unit of the target execution unit into a database; and processing, through the target execution unit, the to-be-processed data indicated by the identifier in the corresponding identifier set,
   wherein determining, for the target execution unit in at least one target execution unit after the adjustment, the identifier set corresponding to the target execution unit, comprises: adjusting a mapping relationship between each target execution unit and each identifier set according to a preset rule, wherein a total number of identifier sets remains unchanged before and after the adjustment of the number of the target execution units in the stream computing system.

6. The apparatus according to claim 5, wherein after the processing, through the target execution unit, the to-be-processed data indicated by the identifier in the corresponding identifier set, the operations further comprise:
   sending indication information to the upstream execution unit of the target execution unit through the target execution unit, the indication information being used to indicate the to-be-processed data having been processed by the target execution unit.

7. The apparatus according to claim 6, wherein the processing, through the target execution unit, the to-be-processed data indicated by the identifier in the corresponding identifier set includes:
   starting the at least one target execution unit after the adjustment; and
   receiving and processing, through the started target execution unit, the to-be-processed data that is sent by the upstream execution unit of the target execution unit and has been determined, from the persisted to-be-processed data indicated by the identifier included in the identifier set corresponding to the target execution unit.

8. The apparatus according to claim 5, wherein the processing, through the target execution unit, the to-be-processed data indicated by the identifier in the corresponding identifier set includes:
de-duplicating, according to a historical record of receiving the to-be-processed data by the target execution unit in the stream computing system, the to-be-processed data sent to the target execution unit by the upstream execution unit of the target execution unit; and
processing, through the target execution unit, the de-duplicated to-be-processed data indicated by the identifier in the corresponding identifier set.

9. A non-transitory computer readable medium, storing a computer program, wherein the computer program, when executed by a processor, causes the processor to perform operations, the operations comprising:
acquiring a to-be-adjusted number of target execution units, the target execution unit referring to a unit executing a target program segment in a stream computing system;
adjusting a number of the target execution units in the stream computing system based on the to-be-adjusted number; and
determining, for a target execution unit in at least one target execution unit after the adjustment, an identifier set corresponding to the target execution unit, an identifier in the identifier set being used to indicate to-be-processed data; persisting, according to the identifier set to which the identifier of the to-be-processed data generated through running of an upstream execution unit of the target execution unit belongs, the to-be-processed data generated through the upstream execution unit of the target execution unit into a database; and processing, through the target execution unit, the to-be-processed data indicated by the identifier in the corresponding identifier set,
wherein determining, for the target execution unit in at least one target execution unit after the adjustment, the identifier set corresponding to the target execution unit, comprises: adjusting a mapping relationship between each target execution unit and each identifier set according to a preset rule, wherein a total number of identifier sets remains unchanged before and after the adjustment of the number of the target execution units in the stream computing system.

* * * * *